United States Patent [19]

Hare, Sr.

[11] Patent Number: 5,158,109

[45] Date of Patent: * Oct. 27, 1992

[54] ELECTRO-RHEOLOGICAL VALVE

[76] Inventor: Nicholas S. Hare, Sr., 252 Pineville Rd., Monroeville, Ala. 36460

[ * ] Notice: The portion of the term of this patent subsequent to May 19, 2008 has been disclaimed.

[21] Appl. No.: 667,328

[22] Filed: Mar. 11, 1991

Related U.S. Application Data

[63] Continuation-in-part of Ser. No. 533,737, Jun. 5, 1990, abandoned, which is a continuation-in-part of Ser. No. 399,178, Aug. 28, 1989, Pat. No. 4,930,463, which is a continuation-in-part of Ser. No. 339,748, May 18, 1989, abandoned.

[51] Int. Cl.$^5$ .......................... F16K 21/10; F16F 9/53
[52] U.S. Cl. .................................. 137/514.3; 137/517; 137/909; 188/267; 188/322.22
[58] Field of Search ..................... 137/514.3, 514, 517, 137/909; 188/267, 322.22

[56] References Cited

U.S. PATENT DOCUMENTS

| | | | |
|---|---|---|---|
| 2,778,259 | 1/1957 | Moir | 188/314 |
| 3,047,507 | 7/1962 | Winslow | 192/21.5 |
| 3,277,874 | 8/1965 | Wagner | 123/90.16 |
| 3,304,925 | 6/1966 | Rhoads | 123/90.55 |
| 3,367,872 | 2/1968 | Martinek | 252/74 |
| 3,490,423 | 1/1970 | Shunta et al. | 123/90.16 |
| 3,682,152 | 8/1972 | Muller-Berner | 123/90.11 |
| 3,742,921 | 4/1973 | Rendine | 123/90.16 |
| 3,786,792 | 1/1974 | Pelizzoni et al. | 123/90.16 |
| 3,809,033 | 5/1974 | Cartledge | 123/90.46 |
| 3,817,228 | 6/1974 | Bywater | 123/90.12 |
| 3,850,405 | 11/1974 | White | 137/514.3 X |
| 3,865,088 | 2/1975 | Links | 123/90.12 |
| 3,964,455 | 6/1976 | Brown | 123/90.43 |
| 4,009,695 | 3/1977 | Ule | 123/90.13 |
| 4,033,892 | 7/1977 | Stangroom | 252/76 |
| 4,133,332 | 1/1979 | Benson et al. | 123/90.16 |
| 4,134,371 | 1/1979 | Hausknecht | 123/90.43 |
| 4,151,817 | 5/1979 | Mueller | 123/90.16 |
| 4,161,306 | 7/1979 | Brune et al. | 123/32 AB |
| 4,203,397 | 5/1980 | Soeters, Jr. | 123/90.16 |
| 4,258,671 | 3/1981 | Takizawa et al. | 123/90.16 |
| 4,284,042 | 8/1981 | Springer | 123/90.16 |
| 4,393,832 | 7/1983 | Samuel et al. | 123/90.14 |

(List continued on next page.)

FOREIGN PATENT DOCUMENTS

| | | |
|---|---|---|
| 3631107 | 3/1988 | Fed. Rep. of Germany . |
| 221034 | 12/1983 | Japan . |
| 968534 | 11/1982 | U.S.S.R. . |
| 756107 | 8/1956 | United Kingdom . |
| 1282568 | 7/1972 | United Kingdom . |

OTHER PUBLICATIONS

"ER Fluid Devices Near Commercial Stage", Scott & Yamaguchi, Automotive Engineering, Nov., 1985.
"Electro-Rheological Fluids and Devices", Automotive Engineering, Dec., 1988.
"Inventors: Got A Use for Liquid That Turns Solid?", Douglas Williams, Automotive Industries, vol. 167, Jan., 1989.

*Primary Examiner*—John Rivell
*Attorney, Agent, or Firm*—Ferrill, Logan, Johns & Blasko

[57] ABSTRACT

A general electro-rheological valve is disclosed used in controlling the flow of fluids in a variety of applications. The valve comprises an inlet in communication with a fluid source, an outlet for transporting the fluid out of said valve, and an oscillating valve member for opening and closing off said inlet. The valve member has a cavity containing an electro-rheological fluid, a perforated electrode member emersed in the electro-rheological fluid within the cavity, and means for electrifying the perforated electrode member such that the electro-rheological fluid within the electrode solidifies, thereby locking the position of the valve member relative to the electrode. In this manner, the valve member, which oscillates with respect to the perforated electrode member, can be frozen in an open, closed, or intermediate position with respect to the inlet. The valve member thereby controls the level of fluid flow through the valve.

20 Claims, 9 Drawing Sheets

U.S. PATENT DOCUMENTS

| | | | |
|---|---|---|---|
| 4,442,806 | 4/1984 | Matsuura et al. | 123/90.16 |
| 4,444,298 | 4/1984 | Stangroom | 192/21.5 |
| 4,452,187 | 6/1984 | Kosuda et al. | 123/90.16 |
| 4,466,390 | 8/1984 | Babitzka et al. | 123/90.16 |
| 4,485,780 | 12/1984 | Price et al. | 123/90.15 |
| 4,493,615 | 1/1985 | Stangroom | 417/48 |
| 4,515,121 | 5/1985 | Matsuura et al. | 123/90.16 |
| 4,515,343 | 5/1985 | Pischinger et al. | 123/90.11 |
| 4,593,658 | 6/1986 | Moloney | 123/90.11 |
| 4,700,678 | 10/1987 | Elliott | 123/297 |
| 4,744,914 | 5/1988 | Filisko et al. | 252/74 |
| 4,772,407 | 9/1988 | Carlson | 252/74 |
| 4,840,112 | 6/1989 | Bhadra et al. | 91/459 |
| 4,858,733 | 8/1989 | Noguchi et al. | 188/267 |
| 4,867,603 | 9/1989 | Chang | 137/517 X |
| 4,930,463 | 6/1990 | Hare, Sr. | 123/90.11 |
| 5,014,829 | 5/1991 | Hare, Sr. | 188/267 |
| 5,029,667 | 7/1991 | Mitsui | 188/267 |

SEC. A-A

ELECTRO-RHEOLOGICAL VALVE

This application is a continuation-in-part of co-pending U.S. Ser. No. 533,737 filed Jun. 9, 1990, now abandoned, which is itself a continuation-in-part of U.S. Ser. No. 399,178 filed Aug. 28, 1989, now issued as U.S. Pat. No. 4,930,463, which is itself a further continuation-in-part of U.S. Ser. No. 339,748, filed Apr. 18, 1989, now abandoned.

BACKGROUND OF THE INVENTION

1. Field of the Invention

The present invention is directed to valves for controlling the flow of either fluids or gases. In particular, the present invention is directed to valves incorporating electroviscous and electro-rheological fluids which are used to control the flow of any fluids, including liquids, gases or slurries.

2. Description of the Prior Art

The present invention is directed to valves which employ electro-rheological fluids that are utilized to control the flow of fluids. In U.S. Pat. No. 4,930,463, electro-rheological valves were utilized in order to control the flow of hydraulic fluid or oil out of a valve controller chamber. The present application illustrates how electro-rheological valves can be universally utilized to control the flow of any fluid, such as gas, water, oil, hydraulic fluid, liquid chemicals, and slurries, between two points along a conduit.

It has been recognized for several decades that certain fluids response to the influence of an electric potential by evidencing a rapid and pronounced increase in viscosity and an increased resistance to shear. Such electro-rheological or electroviscous fluids comprise slurries of finely divided hydrophilic solids in hydrophobic liquids. In the absence of an electric field, these fluids behave in a Newtonian fashion, but when an electric field is applied, the fluids become proportionately more viscous as the potential of the electric field increases. In strong electric fields, these fluids can thicken into a solid. The electro-rheological phenomenon reverses when the electric potential is removed, and the material returns to its fluid state. Electro-rheological fluids change their characteristics very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872, 3,047,507 and 4,033,892. Electro-rheological fluids have been extensively used in clutches as disclosed, for example, in U.S. Pat. Nos. 4,444,298 and 4,493,615, and more recently in shock absorbers and hydraulic applications.

Until recently, the practical application of electro-rheological fluids was limited to low temperature environments due to the previously required presence of water in the electro-rheological fluid. In a high temperature environment, the water in the fluid would vaporize and lead to corrosion. This strictly limited the use of electro-rheological fluids away from high temperature applications on or near gasoline and diesel powered automobile and truck engines and the like. Recently, the temperature problem has been minimized with advances in electro-rheological fluid technology such as those disclosed in U.S. Pat. Nos. 4,744,914 and 4,772,407. Electro-rheological devices, because of their special nature, offer numerous advantages over mechanical valve devices incorporating hydraulic, solenoid and cam operated action, such as that utilized in standard valving.

In view of the above, it would be desirable to provide novel valves incorporating electro-rheological fluids which can be used to control the flow of liquids, gases or slurries in a variety of applications.

It would further be desirable to provide an electro-rheological valve having novel electrode configurations situated within the valve itself which facilitate compactness, control, and replaceability.

It is still a further object of the present invention to provide a dual-sided electro-rheological valve which can be utilized to control fluid flow through a system.

A further object of the present invention is to provide an electro-rheological valve mechanism to facilitate control of fluid flow through a system that is compatible with computers or microprocessors.

Another object of the invention is to provide an electro-rheological valve mechanism which employs a microprocessor to control the appropriate electrodes so as to employ the pressure of the fluid being manipulated by the valve mechanism to supply the actuating force to open and close the appropriate valves.

A further object of the invention is to provide an electro-rheological valve mechanism which is self-contained and which can easily be removed and replaced as a single unit.

It is another object of the invention to provide electro-rheological needle valves which have numerous applications, including controlling dampening in conventional oil-filled shock absorbers.

A still further object of the invention is to provide novel electro-rheological valves which can be locked and controlled in open, closed or intermediate positions.

SUMMARY OF THE INVENTION

The present invention provides an electro-rheological valve mechanism to be used for controlling the flow of fluids in a variety of situations. The electro-rheological valve mechanism comprises an oscillating valve member responsible for opening and closing an inlet or an outlet. The valve member is comprised of a cavity which is filled with electro-rheological fluid and a perforated electrode member which is immersed in the electro-rheological fluid. The present invention provides several novel configurations for the perforated electrode member, each providing the benefits of compactness, easy replacement, and precise control of valve movement. The valve mechanism is a self contained single unit and can easily be removed, installed or replaced.

The electro-rheological valve mechanism also comprises means for electrifying the perforated electrode member. This provides an electric field which solidifies the electro-rheological fluid within the electrode member, thereby locking the position of the valve member relative to the electrode member. In this way the valve member can be controlled and locked in open, closed or intermediate positions within the inlet or outlet. A computer or microprocessor may be employed to control the timing of the activation of the electric field between the electrodes, providing precise control and timing in the movement and locking of the valve member. The use of computers and microprocessors also permit the manipulation of fluid pressure to supply the actuating force necessary to open and close the appropriate valves.

The present invention can be used in a variety of systems and configurations. Most commonly, the electro-rheological valve mechanism is placed within a valve passage to control the opening and closing of that passage to the flow of fluids therethrough. The present invention can also be used to provide a dual-sided valve which can control fluid flow through a passage system. The present invention can further be utilized within a needle valve to control fluid flow into and out of chambers, openings or passageways. Angle valves used within conduits can also be improved through the use of an electro-rheological valve mechanism.

BRIEF DESCRIPTION OF THE FIGURES

The foregoing summary, as well as the following detailed description, will be better understood when read in conjunction with the drawings appended hereto. For the purpose of illustrating the invention, there is shown in the drawings an embodiment which is presently preferred, it being understood, however, that this invention is not limited to the precise arrangement and instrumentalities as shown.

DETAILED DESCRIPTION OF THE PREFERRED EMBODIMENT

Figure 1:
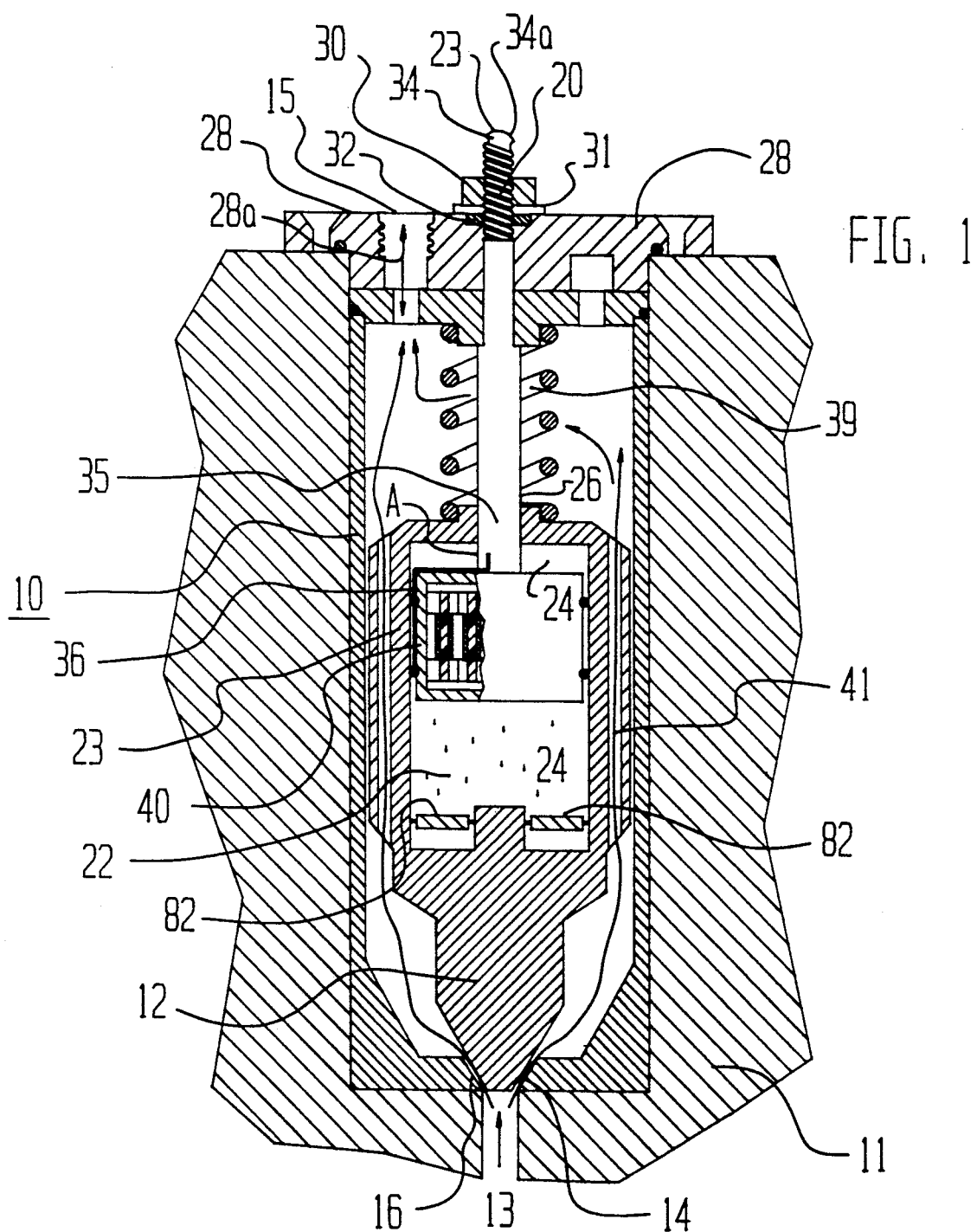
FIG. 1 is a section view of the electro-rheological control valve of the present invention.

The present invention is described with reference to the enclosed Figures wherein the same numbers are used where applicable. Referring to FIG. 1, a valve 10 of the present invention is shown. The valve 10 is retained in a casing 11 which extends within a conduit 11. The conduit may be a line or pipe or other passageway along which a fluid, such as a liquid, gas or slurry, may flow. The valve has a fluid inlet 13 for receiving the fluid from a source, and an outlet 15 for transmitting the fluid downstream of the valve 10. It should be emphasized that the valves disclosed herein can be utilized to control the flow of any liquid, gas or slurry.

As shown in FIG. 1, the valve 10 of the first embodiment comprises a floating head 12 with a land 14 which slidably mates with a valve seat 16 located at the inlet 13. The floating head 12 oscillates in a longitudinal direction with respect to an arm member 20. The center of the head 22 is hollow and contains an electro-rheological fluid 24.

The arm member 20 extends into the center of the valve 10, through a central bore 26 and into a cavity 22. The arm 20 is held in place by a retaining plate 28, gland 30, ring 31 and gasket 32. The end plate 28 has an outlet port 28a for permitting fluid flow out of the valve 10. The arm 20 further has electrode wires 34, 34a contained within a rod 35 (hashed lines) which extend through the hollow center cavity 22. Attached to the arm 20 is a stationary perforated electrode member 36 (partially broken away) having one of the four embodiments set out in FIGS. 3A–6.

The perforated electrode member is emersed within the electro-rheological fluid 24 within the cavity 22. The outside of the piston head has an electronic position sensor 23 which senses the relative position of the valve head 12 and may be used to provide a control signal to a control microprocessor, illustrated in FIG. 8. Each of the embodiments described hereafter may employ a microprocessor like that shown in FIG. 8. In operation, the valve 10 oscillates with respect to the perforated electrode 38 and arm member 20 contained within the cavity 22. A biasing spring 39 situated between the retaining plate 28 and the top of the valve body forces the valve 10 toward a closed position against seat 16. An annular conduit 41 bored into the casing permits fluid to flow between the valve seat 16 and outlet 28a.

It will be appreciated that the electro-rheological device shown provides a convenient means for locking-/releasing a valve closure member. However, the device in and of itself cannot provide the force and motion required to open or close the valve. Such force must be supplied by another agency, for instance: a coiled spring, the force of the fluid which is being controlled, or electro-solenoid, hydraulic or pneumatic pressure.

Figure 2:
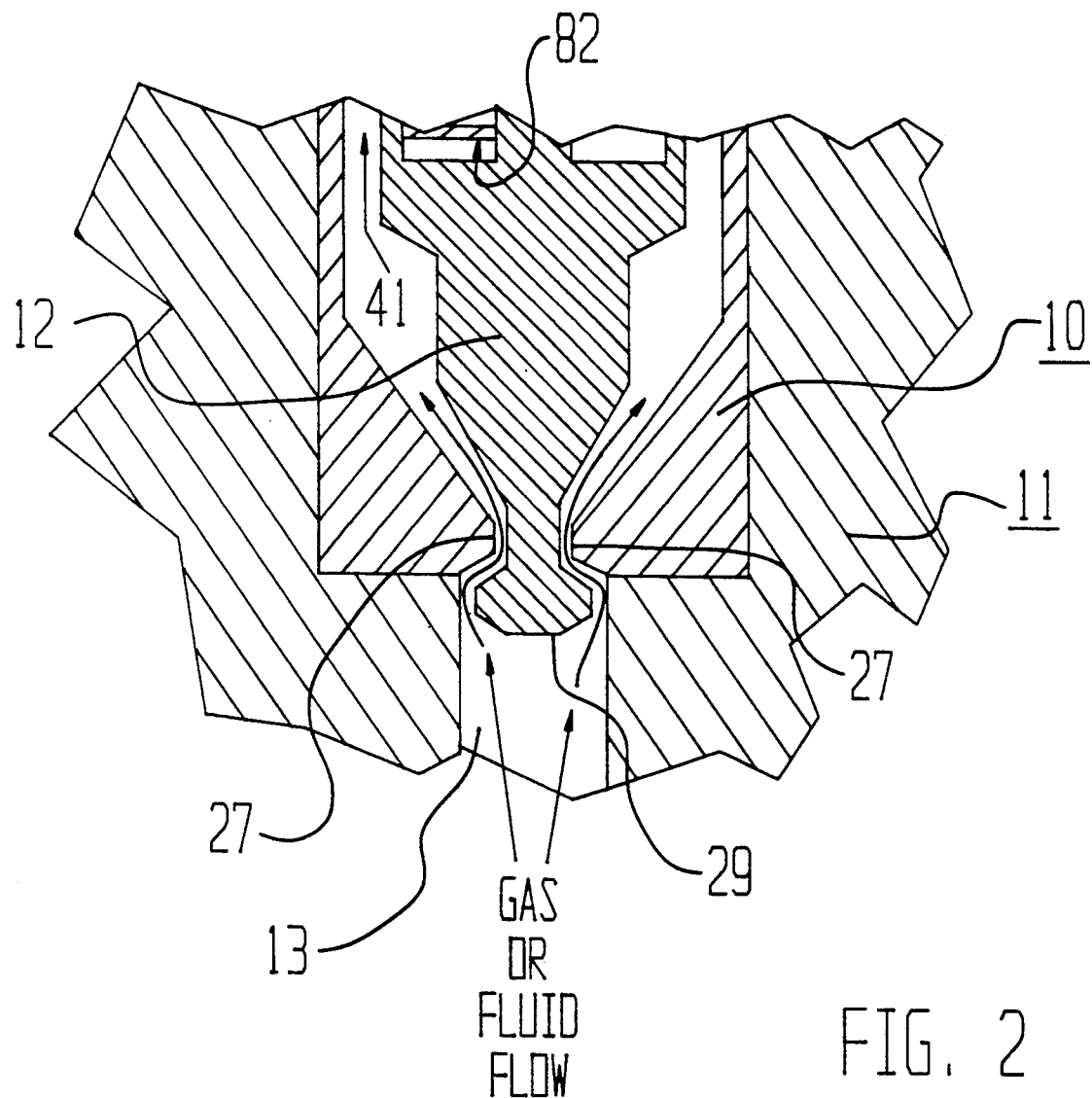
FIG. 2 is a section view of an alternative electro-rheological control valve to be utilized in the present invention.

FIG. 2 illustrates an analog to the valve controller shown in FIG. 1. The valve is identical to the valve controller of FIG. 1 except the valve is biased open. The valve land 29 extends into inlet 13. Upon the application of a fluid pressure in the inlet 13, the valve 10 is forced closed against the seat 27. By applying an electric potential to the perforated electrode, the valve 10 can be locked open until a desired moment of closure.

The embodiments shown in FIGS. 1 and 2 illustrate the use of a coiled spring and the fluid itself as actuating forces used in moving the valve closure member. The coil spring furnishes an actuating force to move the valve closure member in one direction, and the force of the fluid which is being controlled moves the valve closure member in the opposite direction. These embodiments are most appropriate in applications where the fluid flow is stopped and resumed periodically, stops and reverses, or oscillates or reciprocates. An alternative embodiment disclosed in FIG. 8, described in greater detail later, operates in fluid flow systems which have a steady or uninterrupted fluid flow. This alternative embodiment functions in cooperation with a computer or microprocessor.

There are numerous electro-rheological fluids which have been developed. Preferably, the present invention should be utilized with electro-rheological fluids which are designed to operate in high temperature environments such as those disclosed in U.S. Pat. Nos. 4,744,914 and 4,772,407, and which are incorporated herein by reference. As will be described in greater detail herein, the reciprocating perforated piston member functions as an electrode which solidifies the electro-rheological fluid with the valve cavity.

The electrode configurations of the present invention are now described with reference to FIGS. 3A-3D, 4, 5 and 6. While the preferred embodiment of the present invention utilizes one of four or more possible electrode configurations, in each of the embodiments illustrated a perforated or flow-through member contains a sequence of electrodes which, when activated by an electronic impulse, generate a plurality of electric fields which solidify the electro-rheological fluid within the perforations. Such solidification prevents the electro-rheological fluid from flowing through the solidified member. The solidified member then serves as a plunger which compresses the remaining electro-rheological fluid contained in the cavity. This action effectively locks the position of the valve relative to the perforated member and arm.

As shown in FIG. 3A-3D, the first perforated member comprises a hollow cylindrical housing 40 having respective top and bottom plates 42, 44, each having a plurality of elongated radial apertures 46. The top and bottom plates 42, 44 each compress respective perforated insulative layers 48. The perforations of the insulative layers align with apertures 46 on the top and bottom plates. The housing 40 contains a spiral thermally resistant polymer, mylar or plastic band or coil 50 which is coated with a metallic electrode 52, 52a on each of its sides. The metallic coatings 52, 52a can consist of copper, aluminum, silver, nickel or any other electrically conductive material. The band turns are separated by plastic ribs 54 which create both channels for fluid flow as well as maintain the electrical integrity of the coil.

Figure 3D:
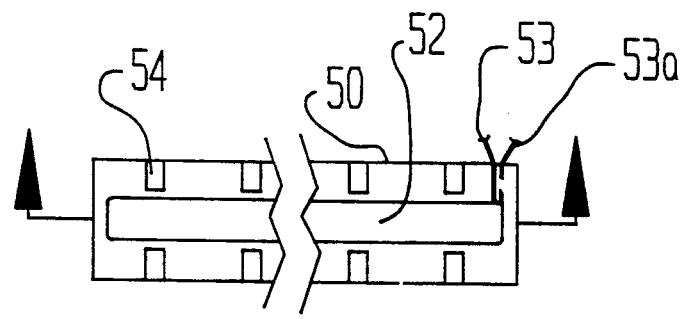
FIG. 3D is a section view of the spiral electrode configuration utilized in the preferred embodiment.
Figure 3C:
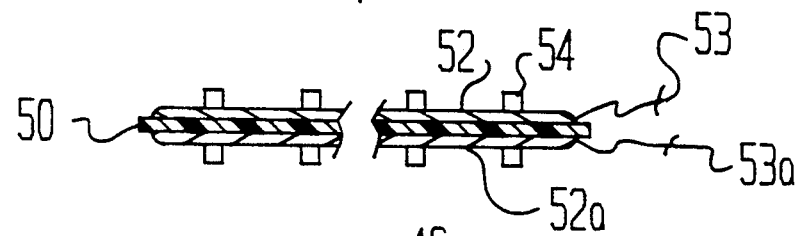
FIG. 3C is a planar view of the spiral electrode along line A—A of FIG. 3A.
Figure 3A:
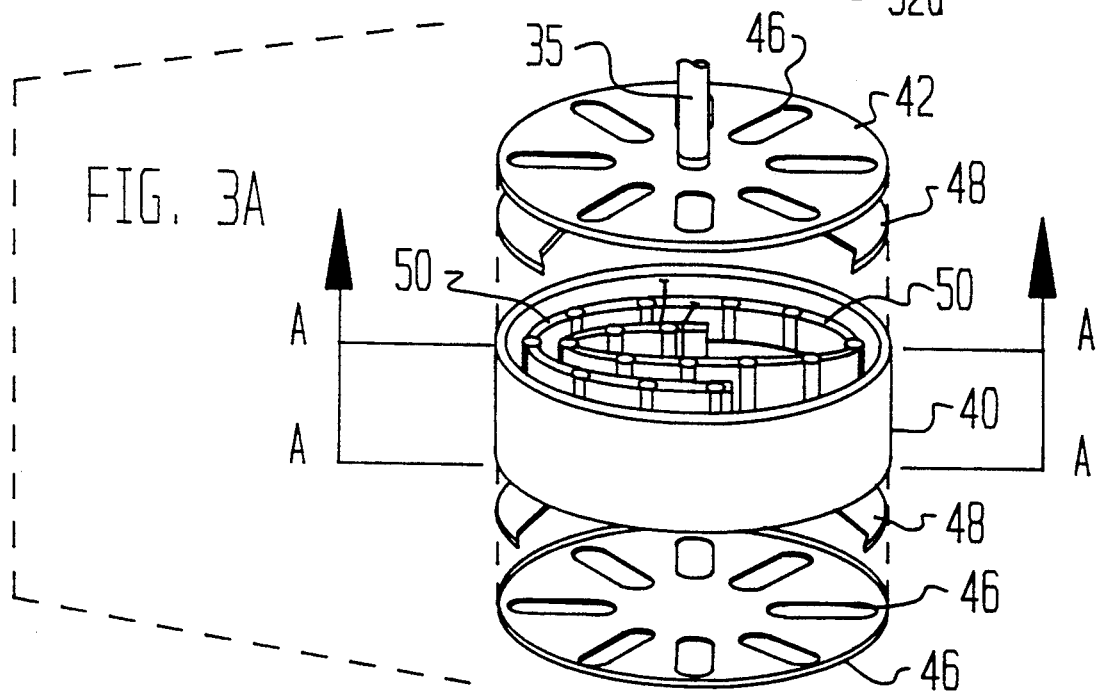
FIG. 3A illustrates an exploded view of the spiral ring electrode configuration utilized in the valve of the preferred embodiment.
Figure 3B:
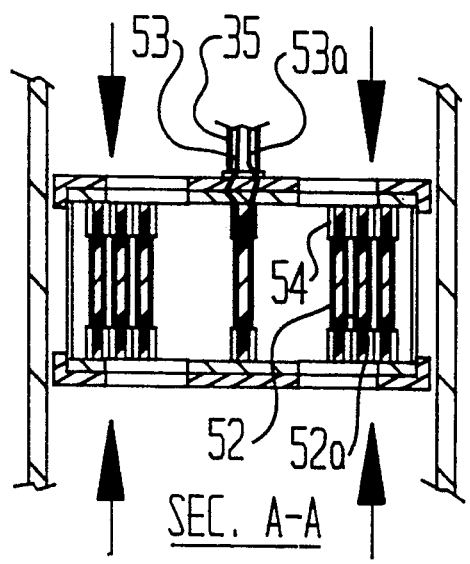
FIG. 3B is a section view of the spiral ring electrode configuration utilized in the preferred embodiment.

At the center of the spiral, one metallic band 50 is connected to a positive terminal 53 with the other being connected to a negative terminal 53a. The electric wiring may extend through hollow rod 35 (FIG. 3B) and is connected through. As shown in FIG. 3B, the spiral coil thus effectively forms a wound alternating sequence of positive and negative terminals. When the electrodes 53, 53a are activated, electro-rheological fluid flowing through the apertures is solidified by the electric field formed between the walls of the spiral coil. The reciprocating flow through piston member thus becomes a solid plunger which applies a downward thrust against the remaining electro-rheological fluid in the cavity.

Figure 4:
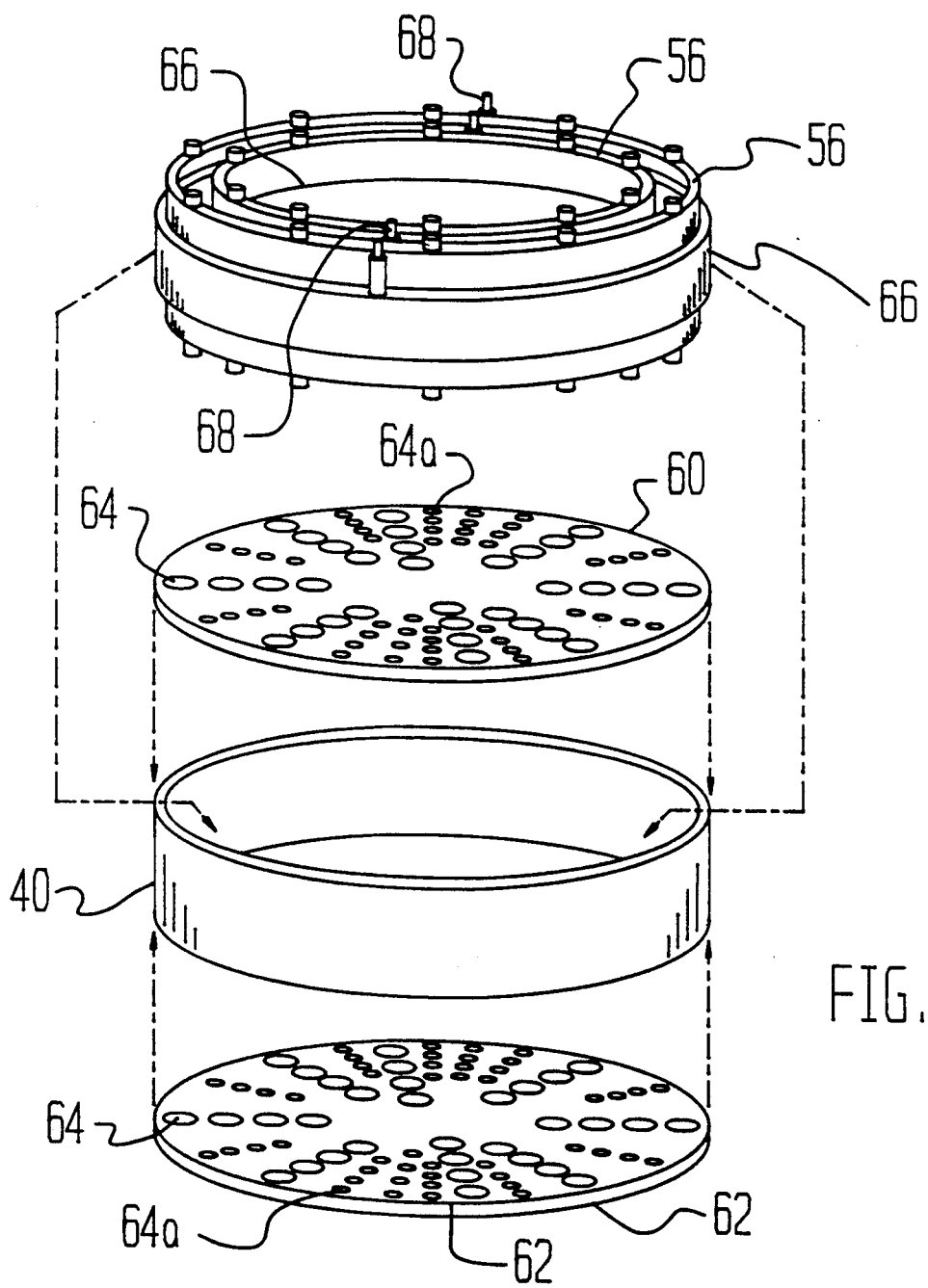
FIG. 4 is a configuration showing concentric rings or cylinders for electrodes utilized in the valve of the preferred embodiment.

Referring to FIG. 4, the flow through piston member comprises a sequence of concentric flat rings, cylinders or bands 56. As with the first electrode configuration of FIGS. 3A-3D, the flat concentric rings, cylinders or bands 56, which may be constructed from temperature resistant polymer, fit within a cylindrical housing 40 and contain respective top and bottom perforated plate members 60, 62. The plates have holes 64 for electro-rheological fluid flow. Each ring is coated on opposite sides with a flat ring or band electrode 66 which is then connected to either a positive or negative terminal 68, through holes 64a and through to a rod 35 (not shown). In operation, electro-rheological fluid flows between the concentric electrode rings and into the upper portion of the housing. When the plunger member is electrified, a plurality of electric fields are created between the electrodes on the concentric bands thereby solidifying the electro-rheological fluid situated therebetween. As with the embodiment of FIGS. 4A-4D, upon the activation of an electrical impulse, the perforated plunger transforms into a solid plunger.

Figure 6:
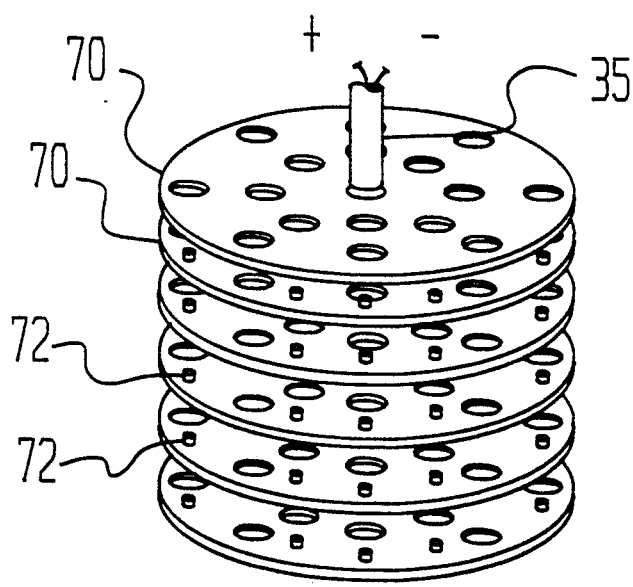
FIG. 6 illustrates an exploded view of the wafer electrode configuration to be utilized in the valve controller of the preferred embodiment.
Figure 6A:
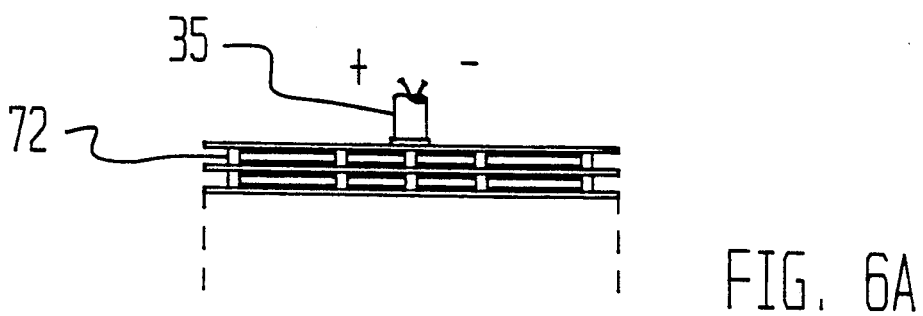
FIG. 6A is a section view of the wafer electrode configuration of the preferred embodiment.

Referring to FIGS. 6 and 6A, the perforated member 36 contains a multiple sequence of perforated metallic disk-shaped wafers 70 through which the electro-rheological fluid flows. The wafers 70 form flow-through screens, are configured alternatingly in a positive to negative relationship, and are retained in a non-contacting position by posts 72 or by separator ring washers. In this embodiment, the housing 40 (not shown) may itself serve as the negative terminal, with alternating wafers being maintained in electrical contact with the housing. The positive wafers are electrically insulated from the negative piston head and are in contact with a positive terminal which is insulated from the housing. In operation, it may be desirable to offset the wafers in order to improve solidification and the pressure characteristics of the plunger. During operation, electro-rheological fluid flows through the parallel disposed disk shaped wafers. When the electrodes are activated, a multiplicity of electric fields are generated between the respective positive and negative terminals formed by the wafers. The electro-rheological fluid within the piston head solidifies and the perforated piston member forms a solid plunger. The solidified plunger compresses the remaining electro-rheological fluid within the cavity and thereby locks the position of the valve.

Figure 5:
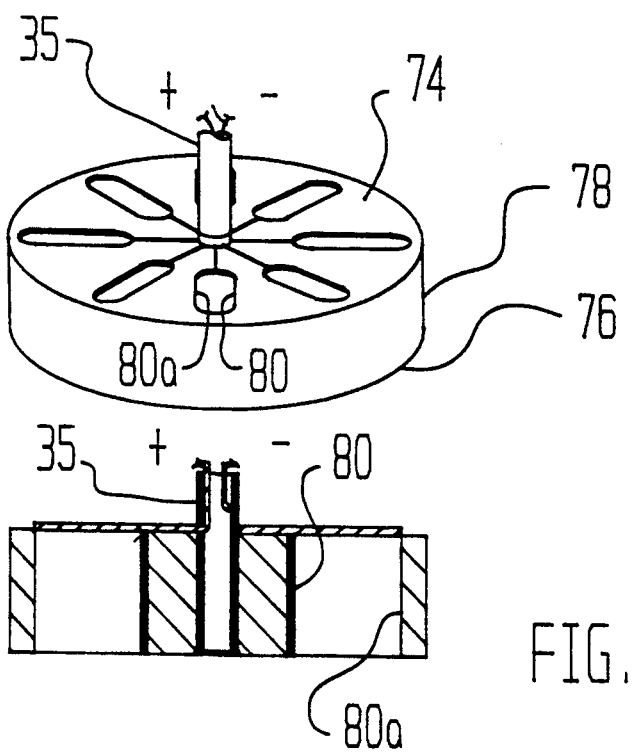
FIG. 5 illustrates a perforated or flow-through piston electrode configuration to be utilized in the valve controller of the preferred embodiment.

A final embodiment of the electrode is illustrated in FIG. 5. As with the previous embodiments, the piston head comprises a cylindrical casing having perforated top and bottom members 74, 76. The casing contains a molded temperature resistant plastic or ceramic disk 78. Disk 78 contains numerous radially extending apertures 80 through which electro-rheological fluid can flow and which are mated with the top and bottom members. The opposite sides of each radial aperture 80, 80a are parallel and equidistant and are coated or plated with copper or other conductive metal and function as respective positive and negative electrodes. The width of each aperture should be between 0.5 and 1.5 millimeters. Electro-rheological fluid flows through the apertures until electrified. When the electrodes are activated, the electro-rheological fluid contained within each aperture solidifies, and the flow through member forms a solid plunger.

The operation of the embodiments of FIGS. 1 and 2 is now described with reference to the enclosed Figures. The valve 10 is inserted into the fluid conduit 11. Referring to FIG. 1, the valve 10 is biased closed by biasing spring 39. The valve member has a cavity 22 filled with electro-rheological fluid 24. An arm 20 and stationary perforated electrode 36 having one of the configurations of FIG. 3A-6 is emersed in the electro-rheological fluid 24. Accordingly, as the valve 10 oscillates, the electro-rheological fluid 24 moves freely through the perforations and valve 10 is free to oscillate with respect to the arm 20 and central bore 26.

As the incoming fluid pressure pushes against the valve member at seat 16, the valve 10 tends to be thrust inward, thereby permitting fluid to enter the valve 10, flow through annular conduit 41 and exit the valve at outlet 28a. When an electric potential is applied to the stationary perforated electrode 36, the electro-rheological fluid therebetween solidifies. The perforated member becomes a solid plunger. A compressive fluid force is created by the solidified plunger within the cavity 22 and the position of the valve 10 is locked. The electronic position sensor 23 may be used to precisely time the actuation of the electrodes for open, closed, and intermediate flow positions.

In the embodiment of FIG. 2, the valve land 29 extends into the inlet 13 of the pipe or conduit 11 and the valve is biased open. The movement of fluid toward the inlet 13 will tend to push the land 29 against the valve seat 16 and close the valve 10. By applying an electric potential to electrode 36, the electrode 36 solidifies and the valve 10 is locked open.

Figure 7:
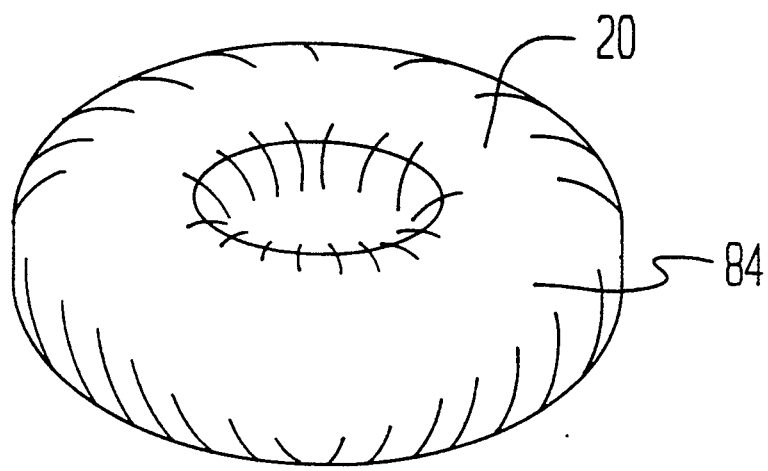
FIG. 7 is a perspective view of a nitrogen filled neoprene ring utilized to compensate for thermal expansion in the present invention.
Figure 7A:
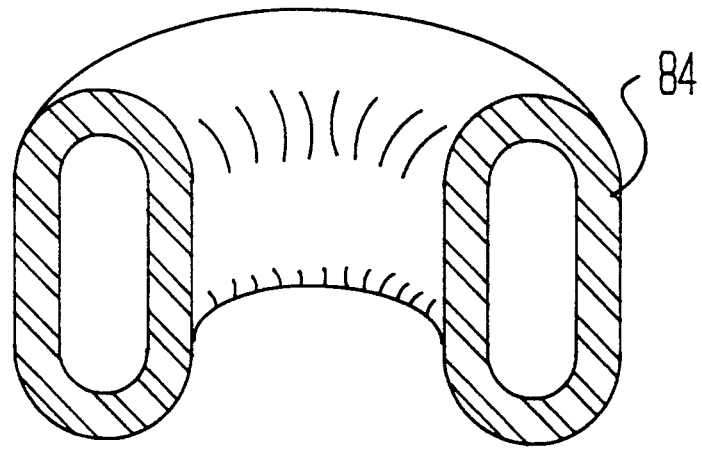
FIG. 7A is a section view of the neoprene ring of FIG. 7.

It will be understood and appreciated by those skilled in the art that provision should be made for the thermal expansion and the volumetric change caused by the movement of the arm 20 into the electro-rheological fluid 24 within the cavity. The present invention includes a ring shaped diaphragm 82 which expands and contracts to compensate for the volumetric changes resulting from the inward movement of the valve. It will be appreciated by those skilled in the art that additional mechanisms can be utilized to compensate for thermal and volumetric expansion of the electro-rheological fluids including the provision of a bubble of nitrogen gas in the cavity. Alternatively, as shown in FIGS. 7 and 7A, a balloon 84 filled with an inert gas such as nitrogen may be utilized to compensate for the thermal expansion of the electro-rheological fluid. The balloon should be made out of neoprene or rubber, and may be in the shape of a tube or doughnut. The balloon 84 can be placed around arm 20 at location 'A' shown in FIG. 1.

Figure 8:
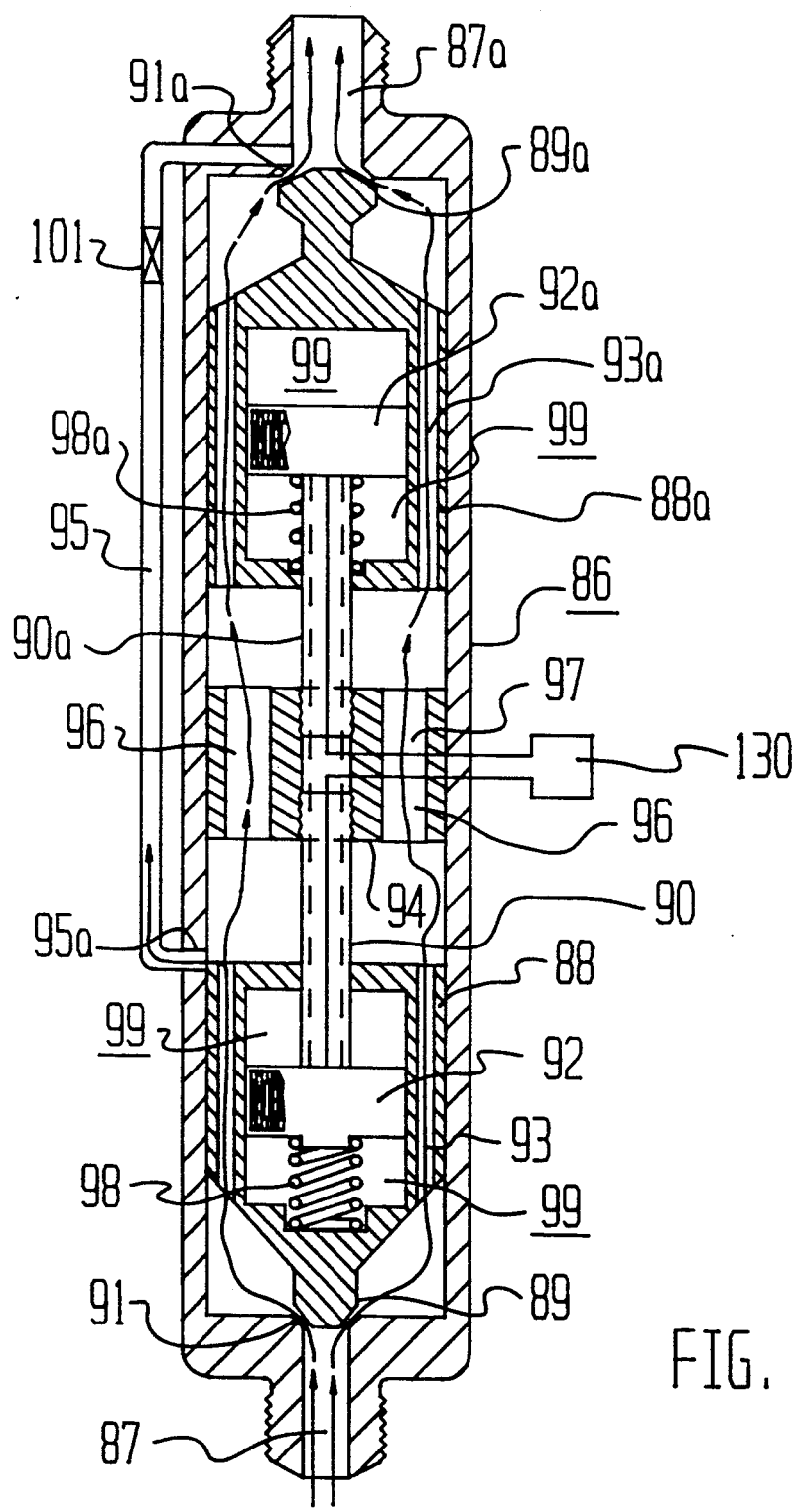
FIG. 8 is a section view of an alternative embodiment including a dual sided electro-rheological valve.

FIG. 8 illustrates an alternate embodiment of the valve of the present invention in which the valve comprises a dual headed electro-rheological lock-release valve. The valve of this embodiment is a general purpose self-actuated valve. As shown in FIG. 8 the dual-headed lock release device of this embodiment comprises a longitudinal casing 86 housing back to back reciprocating hollow valve heads 88, 88a which oscillate with respect to internal stationary hollow arm members 90, 90a. Valve head 88 is an inlet valve and valve head 88a functions as an outlet valve. The inlet valve 88 communicates with an inlet channel 87 and the outlet valve 88a communicates with an outlet channel 87a. The hollow heads 88, 88a support valve members 89, 89a which mate with respective valve seats 91, 91a. The arms are coupled to electrodes 92, 92a. The heads 88, 88a contain annular flow channels 93, 93a through which the fluid of the system may flow. The electrodes 92, 92a are of the form shown in FIGS. 3A-6. The arm members are coupled at their other ends to a central hub 94.

The hub 94 contains two flow channels 96 through which fluid may flow and further contains a core 97 through which electrode control wires may pass from the stationary hollow arm members 90, 90a and out of the casing 86. Each respective arm member contains internal electrode wires through which the electrode members 92, 92a are electrified. The hollow valve heads 88, 88a contain electro-rheological fluids 99 such as those discussed above with respect to the embodiments of FIGS. 1 and 2. The arm member 90a of the outlet valve is biased against the hollow valve by a biasing spring 98a. The biasing spring 98a biases the outlet valve 88a open. The inlet valve includes a biasing spring 98 which biases the inlet valve 88 closed. The system further contains a bleed off passage 95 which extends from behind the inlet valve 88 to the outlet fitting. The passage may include a check valve 101.

As noted above, the hollow valves 88, 88a reciprocate with respect to their respective arm members 90, 90a. The respective perforated electrodes permit electro-rheological fluid 99 to flow through the perforated electrode. When each respective electrode is activated, the electro-rheological fluid 99 within the electrode solidifies and the perforated piston becomes a solid piston. A compressive fluid force is generated against the remaining electro-rheological fluid 99 within the hollow valve heads 88, 88a, thus locking the position of the valve head.

Figure 10:
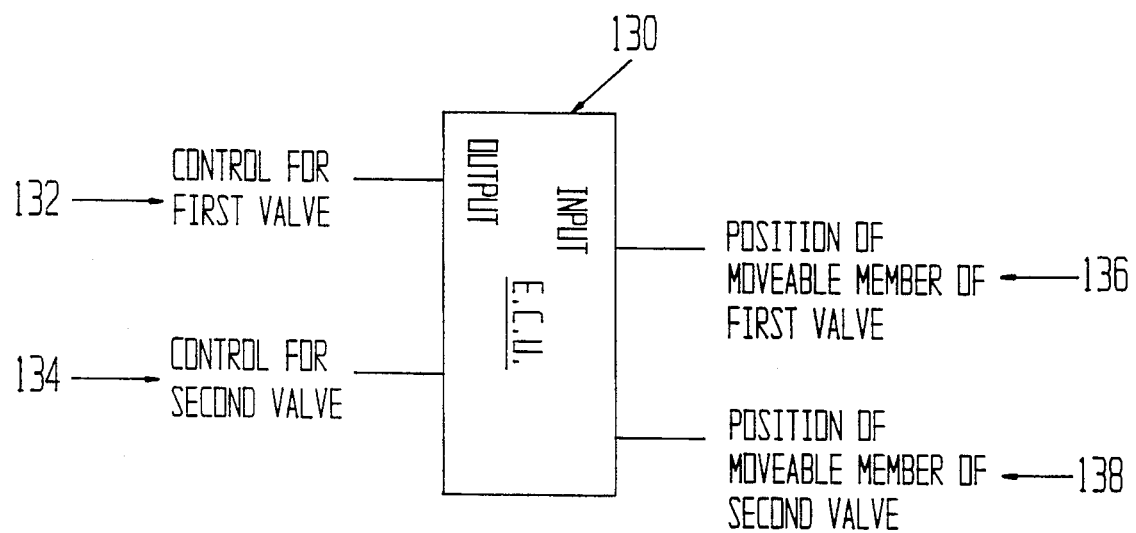
FIG. 10 is a block representation of the computer control system for use with the present invention.

The operation of the embodiment of FIG. 8 is now described in the context of a microprocessor based control system. FIG. 10 is a block representation of one possible computer control system that may be used in conjunction with the embodiment of FIG. 8. It should be pointed out that the computer control system can be altered in order to fit any profile desired. Further, a microprocessor or computer based control system may be used with any of the embodiments discussed in relation to the present invention. In its most basic form, position sensors in each valve signal the control unit 130, indicating if the valve is open or closed. The control unit 130 comprises a conventional microprocessor or computer which provides timing signals to control the electrification of the electro-rheological fluid contained within the valve member. The timing of the opening and closing of the valve member is adjusted by varying the timing of the activation of the electrification signals. The computer or microprocessor receives continuous operating data from the valve mechanism regarding the position of either valve member 136, 138. Timing signals are provided accordingly to control the electrifying of the electro-rheological fluid in the first valve 132 or the second valve 134, permitting the locking or releasing of the valve.

As shown in FIG. 8, the inlet valve 88 is biased closed by compression spring 98. Fluid pressure through conduit 87 can open the inlet valve 88, and the inlet valve 88 thus effectively operates as a check valve or one-way valve. The outlet valve 88a is biased open by the spring pressure of its biasing spring 98a. Fluid pressure through the valve casing tends to force closed the outlet valve 88a.

If the electrode in the inlet valve 88 is not activated, the inlet valve is effectively "unlocked," thus permitting flow of fluid into the inlet valve 88 through the annular orifice 93 and through the orifices 96 in the central hub and to the outlet valve 88a. If the electro-rheological perforated electrode in the outlet valve 88a is unlocked, the moving fluid will close the outlet valve 88a. Therefore, if there is total electrical interruption, the flow of fluid through the system will close the outlet valve 88a, and fluid flow will thus be cut off.

To close the valve and stop fluid flow, the electro-rheological device controlling the movement of the outlet valve 88a is simply unlocked either by a microprocessor based command or by failure of the electric current. This provides an automatic safety cut off of fluid.

To open the valves of the unit, and thus permit flow, the electro-rheological electrode 92 of the inlet valve 88 is unlocked. Fluid pressure from inlet 87 will overcome the counter pressure of the spring 98 and move the inlet valve 88 to the open position. The outlet valve 88a is kept locked in its normal open position by applying an electrical potential to the electro-rheological perforated plunger under microprocessor control. Fluid will flow completely through the unit and out of outlet 87a.

To cut off the fluid flow, the microprocessor signals the electro-rheological device of the outlet valve 88a to unlock (i.e. cuts off the current), whereupon the moving fluid pressure moves the valve closure member to its seat 91, thus shutting off fluid flow.

Opening fluid pressure when the unit has been closed off is accomplished as follows. First, the outlet valve 88a, already closed under fluid pressure, is locked closed by the microprocessor. All fluid flow through the unit thus stops. The fluid pressure in the unit then becomes equalized both ahead of and behind the inlet valve 88, whereupon the spring pressure 98 of the inlet valve will move the inlet valve 88 to the closed position. The microprocessor will then lock the inlet valve 88 in the closed position. When both the inlet valve 88 and the outlet valve 88a are closed, the system effectively creates a "solid hydraulic plug" between the two valves tending to prevent any forward motion of the outlet valve 88a, irrespective of whether the electro-rheological device is locked or unlocked.

In order for the outlet valve 88a to open so as to permit fluid flow, the pressure of the solid hydraulic plug between the first valve and the second valve must be released. This is accomplished by bleeding off fluid through the bleed-off passage 95, whose inlet 95a is located immediately behind the inlet valve 88. The microprocessor locks the electro-rheological device of the inlet valve in its closed position. The hydraulic plug between the inlet and outlet valves is permitted to drain through the bleed off passage into outlet 87a. The microprocessor then unlocks the electro-rheological device of the outlet valve. The biasing spring of the outlet valve 98a will move the outlet valve 88a to its normally open position. The microprocessor then unlocks the electro-rheological electrode of the inlet valve, thereby permitting fluid pressure to move the inlet valve 88 to its open position. Both valves are then locked in the open position by the electro-rheological device under microprocessor command.

Figure 9:
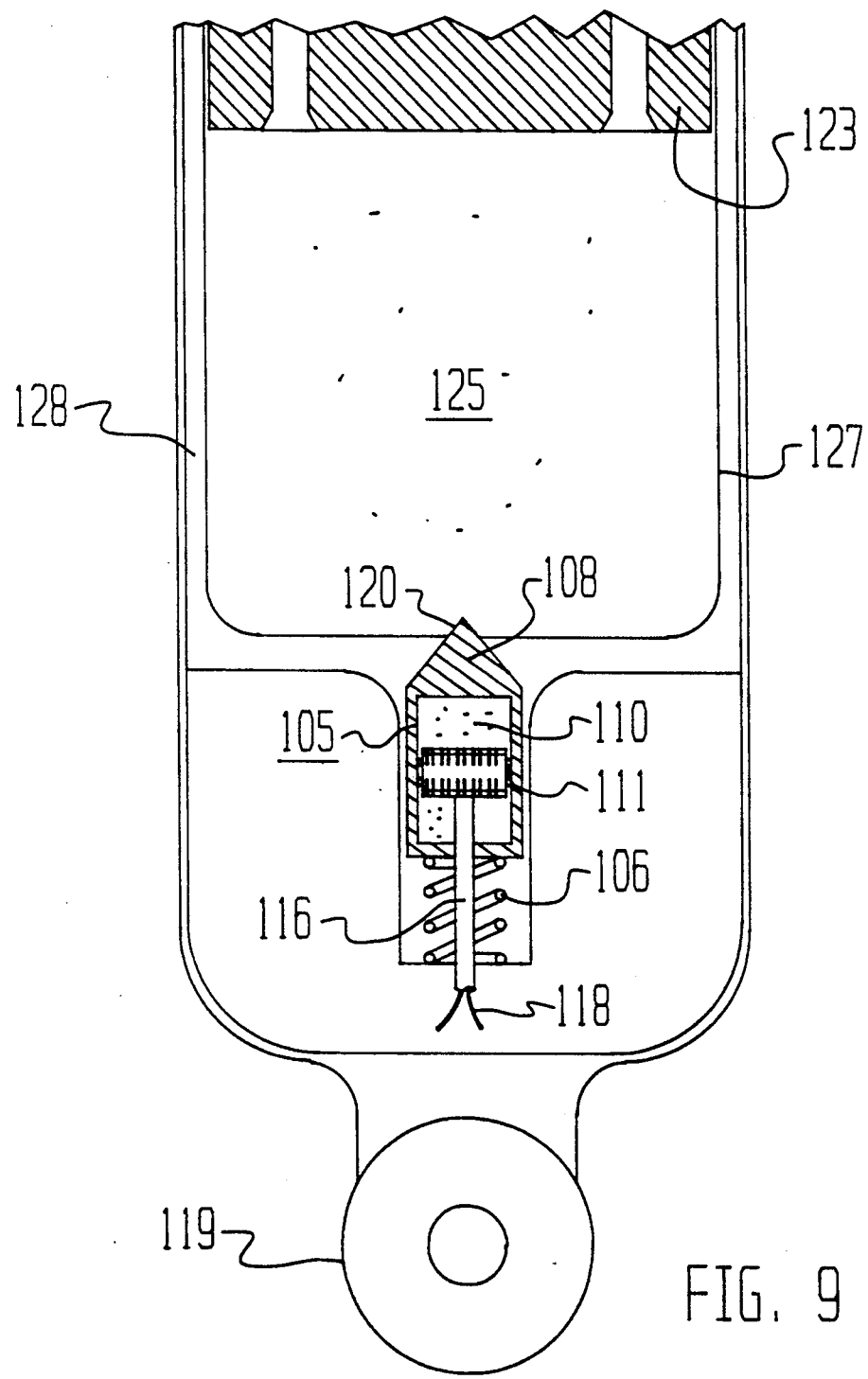
FIG. 9 is a section view of a conventional oil-filled shock absorber which utilizes an electro-rheological valve to control the flow of oil between the main and by-pass chambers.

FIG. 9 illustrates an alternate embodiment of the present invention utilizing electro-rheological means to control the movement of a needle valve which can be inserted into and retracted from openings or passageways. As shown in FIG. 9, the needle valve 105 is hollow and is filled with electro-rheological fluid 110. The valve 105 is biased towards a port 120 in the wall 127 of a chamber 125 by a biasing spring 106, causing the valve head 108 to be extended into the port 120. When the valve 105 is in its most fully biased position, the valve head 108 fills the port 120, halting the flow of fluids through the port 120. The pressure of fluids trying to leave the chamber 125 against the valve head 108 tend to force the valve 105 downward, opening the port 120 and permitting free flow of fluids into and out of the chamber 125.

The valve 105 houses a flow-through electrode 111 which has one of the electrode configurations discussed above in FIGS. 3A-6. The flow-through electrode 111 is held rigid in place by a hollow rod 116 which extends through the center of the valve. Electric wires 118 extend into the rod. By varying the intensity of an electrical signal to the electrode 111, the tendency of the needle valve 105 to open can be increased or decreased.

FIG. 9 illustrates one specific use of the electro-rheological needle valve 105 within a standard oil-filled shock absorber 119. The needle valve 105 functions as a control valve which regulates the flow of oil between the main chamber 125 of the shock absorber and the reserve chamber 128. The control valve 105 is biased closed by the coiled spring 106. Fluid pressure works against the needle valve head 108, tending to push the valve 105 downward away from the port 120 in the main chamber wall 127, opening a passageway between the main chamber 125 and the reserve cylinder 128; i.e. the fluid pressure works against the control valve 105 tending to push it away from the opening 120, the movement or action being opposed by the coiled spring 106.

The biasing spring 106 must be strong enough to force the needle valve 105 substantially closed, yet have the flexibility to permit the valve 105 to be thrust downward when plunger 123 is thrust downward. In operation, oil was forced into and out of the outer sleeve 128, which functions as a reserve chamber, by the reciprocating motion of the plunger 123. Needle valve 105 accordingly opens and closes, with respect to the stationary electrode 111. By increasing the tension force of the needle valve, accomplished by varying the intensity of the electrical signal to electrode 111, less oil passes between the main chamber 127 and reserve chamber 128, thereby dampening the movement of the plunger 123.

Figure 11:
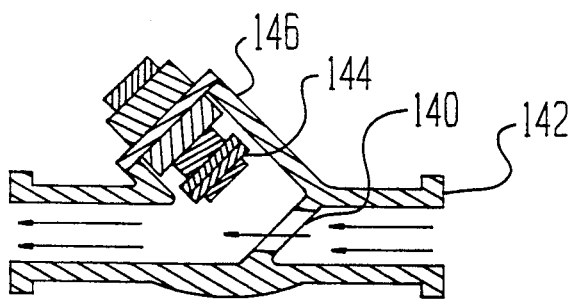
FIG. 11 is a section view of an alternative embodiment of the invention which utilizes an electro-rheological valve mechanism in conjunction with an angle valve.

As illustrated in FIG. 11, the electro-rheological needle valve may also be used to improve the use of an angle valve installed in an ordinary pipe or other airtight conduit used in the transporting of fluids. In this embodiment, a valve seat 140 is positioned within a conduit 142, preferably at an angle with respect to the walls of the conduit 142. The tip of the needle valve 144 may be modified in form, such as that shown in FIG. 11, providing a variety of mating combinations with the valve seat 140. The needle valve 144 is located downstream of the valve seat 140 at an angle perpendicular to that of the valve seat 140. Depending on the size of the conduit 142 and the angle of the valve seat 140 and its mating valve 144, it may be necessary to house the needle valve in a short arm 146 abutting the conduit downstream of, and at an angle perpendicular to, the seat 140. A coil spring (not shown) normally urges the valve closed against the pressure of the moving fluid or gas, in a manner similar to that shown in FIG. 9. The electro-rheological unit, identical to element 111 shown in FIG. 9, holds the valve closed or open when desired. It should be noted that the electrode 111 may be stationary, as shown in FIG. 9, or form part of a piston member, as shown in FIGS. 1 and 2. Since the biasing member needs sufficient closing pressure to urge the valve closed after it has been opened, this configuration is best suited for systems which utilize: fluid flow that is pulsating, oscillating or reciprocating; fluid flow which is stopped and resumed periodically; or fluid flow which may be reversed periodically within the system. Otherwise, the pressure of the fluid or gas passing through the valve must be limited in force, thus permitting the biasing member to shut the valve after it has been opened.

It should be noted that the self-actuated valve illustrated in FIG. 8 can be utilized in conjunction with the needle valve to overcome the limitations discussed above. In this embodiment, two electro-rheological needle valves are utilized as check valves within a pipe or other airtight conduit. The valves are placed in the conduit in opposition, so that one valve opens from the pressure of fluid flow while the second, downstream of the first, is closed by the fluid flow. In its preferred mode, the electro-rheological valves are locked and released by instructions received from a microprocessor as discussed above. This configuration is more fully discussed in the above reference to the embodiment illustrated in FIG. 8, and may include all of the elements contained therein.

The foregoing invention has been described with reference to the above disclosure. It is to be recognized by those skilled in the art that other embodiments fall within the spirit and scope of the present invention and that the true scope of the invention is to be examined with reference to the following claims.

What is claimed is:

1. An electro-rheological valve comprising:
    a valve casing, through which a fluid flows, having an inlet and an outlet, an oscillating valve member for opening and closing said inlet, said valve member having a cavity containing an electro-rheological fluid;
    a stationary perforated electrode member emersed in said electro-rheological fluid with said valve cavity, said valve member oscillating with respect to said perforated electrode member; and
    means for electrifying said stationary perforated electrode member such that the electro-rheological fluid within said electrode solidifies, thereby creating a compressive fluid force against said electro-rheological fluid with said cavity and thereby locking the position of said valve member relative to said electrode, controlling flow of said fluid through said inlet.

2. The electro-rheological valve of claim 1 wherein said stationary perforated plunger member comprises a cylindrical disk having a plurality of apertures extending therethrough to permit the flow of electro-rheological fluid through said disk, each of said apertures containing a negative and positive electrode such that when said electrodes are activated, an electric field is generated in each aperture, thereby solidifying the electro-rheological fluid contained therein.

3. The electro-rheological valve of claim 2 wherein the width of each of said apertures is between 0.5 and 1.5 millimeters.

4. The electro-rheological valve of claim 1 wherein said stationary perforated member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid within said coil.

5. The electro-rheological valve of claim 4 further comprising a plurality of rib members attached to said spiral for maintaining the electrical integrity of said spiral coil when it is placed within said perforated cylindrical casing.

6. The electro-rheological valve of claim 1 wherein said stationary perforated member comprises a plurality of concentric cylinders, each of said cylinders having a positive electrode on a first side and a negative electrode on a second side, the positive electrode on a first band being in proximity to a negative electrode on a second band, such that upon the application of an electric signal to said electrodes, a plurality of electric fields are formed between said cylinders and the electro-rheological fluid between said cylinders solidifies.

7. The electro-rheological valve of claim 6 wherein said concentric cylinders are retained within a hollow cylindrical casing having top and bottom members, said top and bottom members being perforated so as to permit the flow of electro-rheological fluid through said cylindrical casing.

8. The electro-rheological valve of claim 1 in which said stationary perforated member comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid situated therebetween.

9. The electro-rheological valve of claim 1 further comprising processor means for controlling the electrifying of said electrode member.

10. The electro-rheological valve of claim 1 further comprising means for compensating for the volumetric changes in said electro-rheological fluid.

11. The electro-rheological valve of claim 1 further comprising: a second oscillating valve member for opening and closing off said outlet to the outflow of fluid through said casing, said second valve member having a cavity containing an electro-rheological fluid; a second stationary perforated electrode member emersed in said electro-rheological fluid within said valve cavity, said second valve member oscillating with respect to said second perforated electrode member; means for electrifying said second stationary perforated electrode member such that the electro-rheological fluid within said second electrode solidifies, thereby creating a compressive fluid force against said electro-rheological fluid with said second valve member cavity and thereby locking the position of said second valve member relative to said second electrode, controlling flow of said fluid through said outlet.

12. The electro-rheological valve of claim 11 further comprising biasing means for biasing said second oscillating valve means towards an open position, where pressure from said fluid tends to close said second oscillating valve member.

13. The electro-rheological valve of claim 12 wherein said biasing means is a biasing spring.

14. The electro-rheological valve of claim 11 further comprising processor means for controlling the electrifying of said second electrode member.

15. An electro-rheological valve comprising:
- a valve casing having an inlet and an outlet, said casing being laterally aligned with a fluid line and providing passageway for fluid flow between said inlet and outlet;
- an oscillating valve member for opening and closing said inlet, thereby permitting and halting said fluid flow through said inlet;
- electro-rheological control means operatively coupled to said oscillating valve member for locking the position of said valve between an open and closed position, thereby controlling the flow of fluid through said valve.

16. The electro-rheological valve of claim 15 wherein said electro-rheological control means comprises: a cavity within said oscillating valve member containing an electro-rheological fluid; a stationary perforated electrode member emersed in said electro-rheological fluid within said valve cavity, said valve member oscillating with respect to said perforated electrode member; means for electrifying said stationary perforated electrode member such that the electro-rheological fluid with said electrode solidifies, thereby creating a compressive fluid force against said electro-rheological fluid with said cavity and thereby locking the position of said valve member relative to said electrode.

17. The electro-rheological valve of claim 15 further comprising means for biasing said oscillating valve member towards an open position, where pressure from said fluid flow tends to close said valve member.

18. The electro-rheological valve of claim 17 wherein said biasing means is a biasing spring.

19. The electro-rheological valve of claim 15 further comprising means for biasing said oscillating valve member towards a closed position, where pressure from said fluid flow tends to open said valve member.

20. The electro-rheological valve of claim 17 wherein said biasing means is a biasing spring.

* * * * *

UNITED STATES PATENT AND TRADEMARK OFFICE
CERTIFICATE OF CORRECTION

PATENT NO. : 5,158,109
DATED : October 27, 1992
INVENTOR(S) : Nicholas S. Hare, Sr.

It is certified that error appears in the above-identified patent and that said Letters Patent is hereby corrected as shown below:

On title page, item [63] "May 18, 1989" should be --April 18, 1989--

Column 1, line 32 "response" should be --respond--

Column 12, line 61 "means" should be --member--

Column 14, line 3 "with" should be --within--

Signed and Sealed this

Fifth Day of October, 1993

Attest:

BRUCE LEHMAN

*Attesting Officer*     *Commissioner of Patents and Trademarks*